3,010,878
PROCESS FOR THE PRODUCTION OF EBURICOIC ACID

Samuel Cheng Pan, Metuchen, and Leonard Joseph Lerner, New Brunswick, N.J., assignors to Olin Mathieson Chemical Corporation, New York, N.Y., a corporation of Virginia
No Drawing. Filed Sept. 8, 1959, Ser. No. 838,441
4 Claims. (Cl. 195—51)

This invention relates to a new and improved method for preparing eburicoic acid.

Eburicoic acid is a $C_{31}$-steroid carboxylic acid having the formula

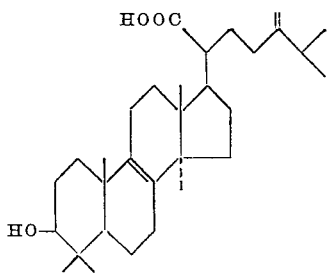

which had heretofore been isolated from surface cultures of fungi of the class Basidiomycetes, in yields approximating 10% based on the weight of the mycelium. Recently aroused interest in the acid because of its selective anti-androgenic activity (it selectivity inhibits androgenic effect on ventral prostate glands, seminal vesicles and coagulating glands but not androgenic effect on total body growth) has created the necessity for a method of preparing the acid in commercially feasible quantities and yields.

Attempts to develop these fungi in submerged cultures for use in commercial vat type installations have been heretofore unsuccessful, the prior attempts having been limited to the use of conventional culture media under conventional fermentation conditions. Thus in accordance with known procedures, attempts were made to inoculate conventional nutrient media containing sources of carbon, energy, nitrogen, buffering substance, minerals, etc. with a sample of a growing culture of an eburicoic acid producing fungus, and to cultivate the inoculated media in shaking flasks under conventional incubation conditions, in expectation of thus adapting fungus to growth under submerged conditions. No reason would be apparent for the fungus to resist this procedure since it is the normal method for cultivating microorganisms under submerged conditions. It was found however, that all attempts to adapt eburicoic acid producing fungi to submerged growth by conventional means were not successful, so that until the present invention fermentation with eburicoic acid fungi has been limited to the use of uneconomical, commercially nonfeasible surface cultures.

It is an object of this invention to provide an improved and efficient fermentation method for the preparation of eburicoic acid.

It is a further object of this invention to provide a method whereby eburicoic acid is prepared in high yields by the fermentation of fungi of the class Basidiomycetes in submerged cultures.

These and other objects are accomplished in accordance with this invention by the discovery that eburicoic acid can be prepared in commercially feasible titers by growing an eburicoic acid-producing fungus in a submerged culture on a nutrient media containing conventional sources of carbon and nitrogen in the presence of oxygen, if the pH of the fermenting culture is maintained below about 6. By contrast, it has also been found that when eburicoic acid-producing Basidiomycetes are incorparated on conventional nutrient media which contain buffering agents for maintaining the pH at about the neutral range, the cultures fail to develop, except perhaps for scanty surface development, whereas by merely omitting the buffering substance and maintaining the pH below about 6, a fully developed submerged culture, which produces eburicoic acid in high yields, is obtained. In most cases the pH value will be maintained at a suitable acid pH even without the addition of acid, if the nutrient is free of buffering agent.

The fungi which are useful in the practice of this invention are those which are capable of yielding eburicoic acid upon being grown in surface cultures in accordance with conventional procedures, the majority of which are within the class Basidiomycetes. Particularly useful are such known fungi as Polyporus sp. such as *P. Anthracophilus, P. eucalyptorum, P. hispidus* and especially *P. sulfureus;* Fomes sp., such as *F. Officinalis;* Poria sp. such as *P. cocos* and Lentinus sp. such as *L. dactyloides.*

As stated, hereinbefore, in accordance with the process of this invention eburicoic acid is produced by aerobic submerged cultivation of a culture of an eburicoic-acid-producing fungus. This is accomplished by initially inoculating a suitable sterile nutrient medium with the fungus and incubating the mixture under aerobic conditions at 20 to 35° C. for a period of from one-half month to one month, the pH being adjusted, if necessary, to a pH below about 6.0, preferably about 5.5 throughout the fermentation. If the pH rises above 6.0, an acidic substance such as a mineral acid or an organic acid (e.g. oxalic acid) should be added in sufficient quantity to lower the pH to below 6.0. In inoculating the sterile nutrient medium spore suspensions, subcultures or culture slants of the fungus can be used. The initial culture can be developed in either of two ways. By the first method the culture is grown at 25° C. in flasks placed on rotary shakers and after an incubation period of about fifteen to twenty days abundant submerged growth is noted. Alternatively, submerged growth may be initiated by inoculating a flask containing the nutrient medium with the mycelial growth taken from an agar slant and incubating without shaking at 25° C. After about a month of incubation the contents of the flask including the mycelial pad on the surface of the culture and the culture fluid below, is homogenized under sterile conditions in a blender and the homogenized culture is used to inoculate a flask containing the same medium. Incubating the flask on a rotary shaker as described above for about 7–10 days yields a fully grown submerged culture.

The submerged culture obtained in accordance with one of the methods described above is used to inoculate larger volumes of media in suitable containers. By successively inoculating increasing volumes of media, submerged cultures can be obtained which are suitable for use in the large tanks and vats customarily employed in the fermentation industry. Stationary vat fermenters equipped with suitable agitation and aeration devices particularly useful when commercial quantities or eburicoic acid are required, but smaller quantites can be readily produced by the submerged culture method carried out in small flasks which are either shaken or stirred by suitable mechanical means.

A wire variety of nutrient media may be used in carrying out the fermentation process of this invention. It is only essential that no buffering substance be added which would maintain the pH above 6.0. Such media should contain a source of assimilable carbon, a source of assimilable nitrogen source, usually a proteinaceous material, mineral salts and traces of various nutrients, vitamins and other growth stimulants which are usually found as impurities in the other constituents of the medium.

As assimilable carbon sources sugars (such as glucose, arabinose, fructose, galactose, lactose, maltose, rhamnose or xylose) or other polyhydric alcohols (such as glycerol, mannitol or rhamnitol) can be used. Dextrins and dextrans can also be used.

As assimilable nitrogen sources, ammonium salts, e.g., ammonium sulfate or proteinaceous materials such as beef extract, acid hydrolyzed casein, soybean meal, beef peptone, soybean oil meal, distillers' slops, corn steep liquor, dried fermentation residues, mixtures of amino acids from either natural or synthetic sources, urea and purines can be used.

The principal mineral, vitamin and growth stimulant requirements are usually satisfied by their presence in sufficient quantity in the impure assimilable carbon sources and/or proteinaceous materials. In case ammonium salts are used as the nitrogen source, mineral salts e.g. potassium acid phosphates, magnesium sulfate, manganese chlorides etc. should be added.

Eburicoic acid is isolated from the fermentation mass by extraction procedures. The culture is harvested and filtered by means of a filter press or other suitable means to separate the mycelium from the culture fluid. The mycelium cake is washed with water and is then dried under vacuum or by other suitable means. The dried cake containing all the fermentation solids, is extracted with a solvent which is capable of dissolving eburicoic acid. Conventional organic solvents, among which are ether, chloroform, n-butanol and methylisobutylketone, can be used. Relatively pure eburicoic acid can be crystallized from the organic solvent solution and either used in this form, or else if desired or necessary, can be subjected to further recrystallization steps.

The invention is illustrated by the following examples.

*Example 1*

Erlenmeyer flasks (250 ml.) containing 1.25 grams of glucose and 750 mg. of soybean meal in 50 ml. of water are inoculated with a small amount (i.e., 0.1 g.) of surface growth taken from a stock culture of *Polyporus sulfureus* (ATCC 9387) on Difco malt agar slants. No buffering material is added to the medium, the pH of which is 5.5–6.0. The flasks are incubated at 25° C. on a rotary shaker set at 280 r.p.m. and a 2" stroke. Abundant submerged growth is observed, and after 20 days 5 ml. portions of the submerged growth are used to inoculate each of twenty flasks (500 ml.) containing 100 ml. of the same medium in each flask. These flasks are incubated under the same conditions as above stated. The fungus starts to grow in submerged conditions without delay, growth being accompanied by a fall in pH to about 2.0 in five days. At the end of one week the fully grown submerged cultures are pooled and the total volume of two liters is used to inoculate a 10 gallon fermenter containing 8 gallons of the same medium. The stainless steel fermenter is equipped with both aeration and agitation means. The medium is permitted to ferment at 25° C. with agitation and aeration by an air stream having a velocity of 2 ft. per minute. Small amounts of lard oil whenever necessary, are added to prevent foaming. After seven days, the entire, fully growing submerged culture is finally used to inoculate a 200 gallon fermenter containing 150 gallons of the same medium and fermentation is continued under the same conditions of aeration and agitation along with the addition of lard oil whenever necessary.

At the end of fourteen days of incubation under the above conditions, the culture is harvested. The solids (mycelium) are separated from the culture fluid by means of a filter press and the mycelium cake is twice washed with one liter portions of water. The dried mycelium cake is ground and first extracted with hexane. The hexane extract is discarded and the residue is exhaustively extracted with chloroform. The chloroform extract is evaporated under vacuum to near dryness yielding about 900 g. of crude eburicoic acid. The crude product is recrystallized twice from ethanol to yield about 477 g. of colorless needles having a melting point of about 274° C.

*Example 2*

Erlenmeyer flasks (250 ml.) containing the medium of Example 1 are inoculated with a small amount (i.e. 0.1 g.) of surface growth taken from a stock culture of *Fomes officinalis* on Difco malt agar slants. No buffering material is added to the medium, the pH of which is 5.0 to 6.0. The flasks are incubated at 25° C. on a rotary shaker set at 280 r.p.m. with a 2 inch stroke. Abundant submerged growth is observed and after 20 days, 5 ml. portions of the submerged growth are used to inoculate each of 20 flasks (500 ml.) containing 100 ml. of the same medium in each flask. These flasks are incubated under the conditions set forth above. The submerged cultures thus obtained are pooled and used to inoculate a 10 gallon fermenter containing the same medium and the inoculated medium is incubated. By successive incubation and transfer, a submerged culture is obtained in a 200 gallon fermenter, in which fermenter, the medium is incubated for 14 days. At the end of the incubation period the mycelium cake is treated and extracted in accordance with the procedure of Example 1 to yield a crude product (850 g.) which is twice recrystallized from ethanol to yield about 457 g. of colorless needles having a melting point of about 274° C.

In a similar manner, the medium of Example 1 may be inoculated with the *Poria cocos, Lentinus dactyloides* and by successive inoculation and transfer, there is obtained, abundant submerged growth, which upon harvest and extraction, yields eburicoic acid.

The invention may be otherwise embodied within the scope of the appended claims.

What is claimed is:

1. A process for the production of eburicoic acid which comprises aerobically incubating an eburicoic acid-producing fungus of the class Basidiomycetes selected from the group consisting of Polyporus, Fomes, Poria and Lentinus under submerged conditions on a nutrient medium containing an assimilable source of carbon, an assimilable source of nitrogen and minerals, maintaining said nutrient medium at a pH below about 6 and free of buffering substances during the incubation period.

2. A process for the production of eburicoic acid which comprises inoculating an unbuffered, sterile nutrient medium containing an assimilable source of carbon, an assimilable source of nitrogen and mineral salts with an eburicoic acid-producing fungus of the class Basidiomycetes selected from the group consisting of Polyporus, Fomes, Poria and Lentinus and incubating the mixture under aerobic conditions at a temperature of about 20 to 25° C. for a period of from about one-half month to one month, maintaining the pH of the culture during the entire period of incubation below about 5.5 and separating the product from the fermentation medium.

3. A process as in claim 2 in which the fungus is *Polyporus sulfureus*.

4. A process as in claim 2 in which the fungus is *Fomes officinalis*.

References Cited in the file of this patent

Wettstein: "Experientia," vol. 15, XII (1955), pp. 465–504.